March 28, 1950      A. T. ROBERTSON      2,502,027
SPEED CONTROLLING APPARATUS

Filed March 24, 1948      2 Sheets-Sheet 1

Inventor
A. T. Robertson
By Watson, Cole,
Grindle & Watson
Attorney

March 28, 1950            A. T. ROBERTSON            2,502,027

SPEED CONTROLLING APPARATUS

Filed March 24, 1948                                      2 Sheets-Sheet 2

Inventor
A. T. Robertson
By
Watson, Cole, Grindle + Watson
Attorney

Patented Mar. 28, 1950

2,502,027

UNITED STATES PATENT OFFICE 2,502,027

SPEED CONTROLLING APPARATUS

Alexander Thornton Robertson, Newcastle-on-Tyne, England, assignor to The Cline Electric Manufacturing Company, Chicago, Ill., a corporation of Illinois Application March 24, 1948, Serial No. 16,828
In Great Britain April 2, 1947

12 Claims. (Cl. 318—161)

This invention relates to speed-controlling apparatus, and, whilst primarily applicable for controlling the speed of electrically driven machinery, is also applicable for controlling the speed of machinery driven by other means. The invention is concerned mainly with machinery having substantial inertia, in which, when an adjustment of the speed controlling apparatus is made, some time elapses before the machinery accelerates or decelerates to the new speed, which may be termed the equilibrium speed.

In the case of a heavy machine, such for example as a printing press driven by a variable speed electric motor, it is customary to provide a pilot motor to drive the speed-adjusting means, and to control the pilot motor by push buttons, a "raise speed" push button being operated to drive the pilot motor in one direction to increase the speed, or a "lower speed" push button being operated to drive the pilot motor in the opposite direction to reduce the speed. The particular type of speed adjusting means will, of course, depend on the driving means. For example, in the case of a direct current compound wound motor it may comprise a rheostat in series with the shut field; in the case of an alternating current commutator motor it may comprise a brush-moving device or induction regulator, while in the case of an induction motor it may comprise a variable resistance in the rotor circuit.

According to the present invention, speed-controlling apparatus of the type in which a speed-adjusting means for a main machine is set in motion upon the operation of a "raise speed" or "lower speed" control, includes means, automatically operated in accordance with speed changes of the main machine, for setting in motion the speed-adjusting means to lower speed when the raise speed control is released for as long as acceleration continues and vice versa.

The automatic means may comprise a flywheel mechanically coupled to the main machine, "raise speed" and "lower speed" relays, manually controlled "raise speed" and "lower speed" contacts in the circuits respectively of the "raise speed" and "lower speed" relay windings, acceleration and deceleration contacts arranged to be closed by respectively the accelerating and decelerating torque exerted by the main machine on the flywheel and connected in parallel respectively with the "lower speed" and "raise speed" manually controlled contacts, and normally closed contacts operated by the "raise speed" and "lower speed" relays respectively and in series with the "lower speed" and "raise speed" relay windings respectively.

It will be appreciated that when a control button, for example the "raise speed" button is operated, the speed adjusting means is shifted by the pilot motor and alters the speed-torque characteristic of the main motor. For a given curve of frictional resistance to speed this means that what may be termed the equilibrium speed is raised. At the prevailing speed there will, therefore, be an excess torque which will cause the machine to accelerate at a finite rate. As the actual speed approaches the equilibrium speed, the value of this acceleration gradually decreases, and in theory an infinite time would be required for the speed to become absolutely steady. In order to achieve the desired change of speed in a reasonable time it has in the past been possible for the operator to hold the button long enough to shift the speed-adjusting means beyond the point corresponding with the desired equilibrium speed, so that higher acceleration will be produced for an appropriate time, and then to press the other button so as to move the speed-adjusting means back again, in time to prevent the machine from over-shooting the desired speed. It will be appreciated that with a given equipment a given increase of speed will be produced in the minimum possible time if the "raise speed" button is held pressed as long as possible and when this button is released the "lower speed" button is immediately pressed, so as to move the speed adjusting means in the opposite direction, until the actual speed meets the equilibrium speed, whereupon the button is released.

By means of the present invention this sequence of operations is automatically ensured on all occasions. Immediately the "raise speed" button is released the speed-adjusting means is reversed and continues to run in the reverse direction until there is no acceleration (or the acceleration falls below the given value), thereby reducing the equilibrium speed.

It is, of course, still necessary for the operator to judge how long the "raise speed" button should be held pressed, since a certain amount of further acceleration occurs after this button has been released. At the same time such judgment is rendered considerably easier by means of the invention since the further increase of speed that occurs after the button is released is very greatly reduced.

The invention may be carried into practice in various ways, but one specific embodiment and three alternative modifications will now be described by way of example, with reference to the accompanying drawings, of which Figure 1 is a diagram illustrating the embodiment of the invention;

Figure 1:
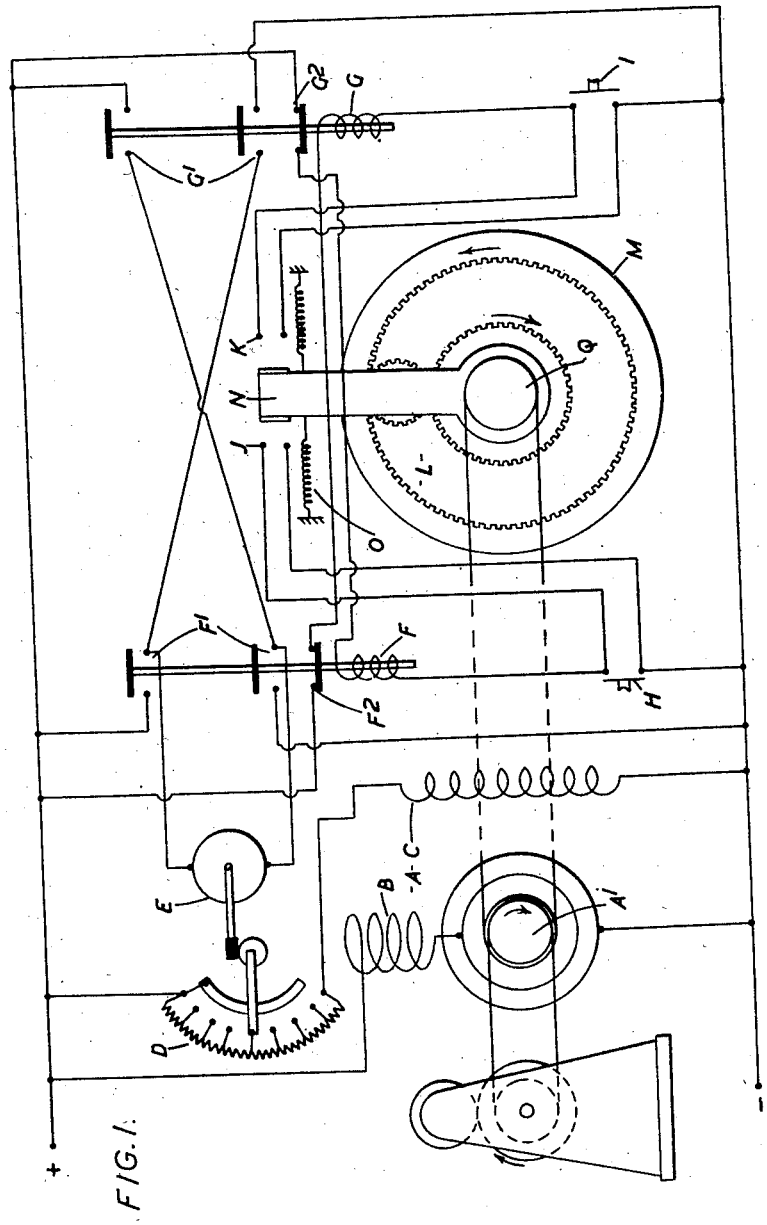

In the embodiment of the invention shown in Figure 1, the main driving machine is a compound wound D. C. motor A having an armature $A^1$ and series and shunt field windings B and C respectively. A speed regulator in the form of a rheostat D in series with the shunt field windings C is controlled by a D. C. electric pilot motor E of a type which can be reversed by reversing the direction of its supply, for example separately excited by windings not shown. The pilot motor E is connected mechanically to the movable contact of the rheostat D through worm-and-wheel or other suitable linkage, so that when energised it serves to increase or decrease the resistance in series with the shunt winding of the main motor A.

The supply of the pilot motor E is controlled by two sets of normally open double pole contacts $F^1$ and $G^1$ which are arranged in parallel and can be closed by relays F and G respectively. The supply lines from one set of contacts $G^1$ to the motor E are crossed, so that when the motor E is fed through this set of contacts its direction of rotation will be the opposite of that which it would have when fed through the contacts $F^1$. The relays F and G are connected in parallel across the supply mains, and each is controlled by a press-button contact H or I connected in series with it. In addition normally closed contacts $F^2$ and $G^2$, opened when the relays F or G respectively are energised, are connected in series with the windings of the relays G and F respectively.

The arrangement will be taken to be such that the press-button H is that used for increasing speed and the press-button I is that used for decreasing speed.

The press buttons H and I are shunted by contacts J and K respectively, which are associated with a form of torque switch generally indicated at L and operated mechanically by the driven machine. In the embodiment of Figure 1, the torque switch L comprises a flywheel M driven through an epicyclic gear from the main machine A. The intermediate member of the epicyclic gear carrying the planet pinions comprises an arm N, the outer end of which cooperates with the pairs of contacts J and K so that if the arm rotates about its pivot in one direction one pair of contacts is closed, while if it moves in the other direction the other pair of contacts is closed. The arm may be provided with one or more springs O so that it normally floats in a central position, the springs being if necessary biassed to allow for the torque required to overcome friction of the flywheel. The directions of rotation are such that when the driven machine is accelerating, the arm N will move towards and close the contacts K, and when the driven machine is decelerating, the arm N will move towards and close the contacts J.

Figure 2:
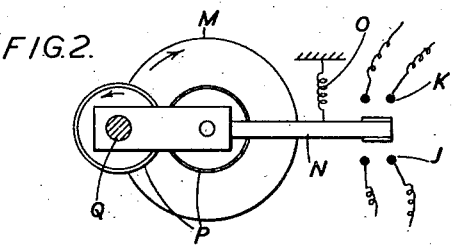
Figure 2 shows an alternative construction of the torque switch of the embodiment of Figure 1.

Figure 2 shows an alternative construction for the torque switch, in which the flywheel M is rotatably mounted on the arm N, and is driven by gearing P from a driving shaft Q which carries one end of the arm, while the other end of the arm operates the contacts J and K.

Figure 3:
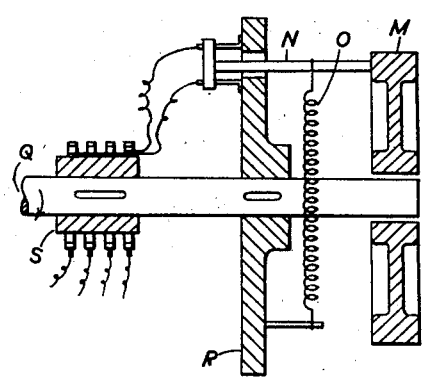
Figures 3 and 4 are side and end elevations, partly in section, of another alternative construction of the torque switch of the embodiment of Figure 1.
Figure 4:
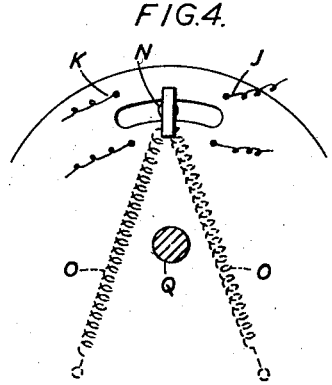

Figures 3 and 4 show another alternative construction for the torque switch, in which the flywheel M is rotatably mounted on the driving shaft Q, and is driven by a flange R positively attached to the driving shaft, through the arm N, one end of which is rigidly attached to the flywheel and the other end of which passes through a slot in the flange R to take the drive and to bridge either pair of contacts when accelerating or decelerating. Springs O maintain a floating position of the arm N as before, when the angular velocity of the driving shaft is constant. Connections to the rotating contacts J and K are made through slip-rings S.

Figure 5:
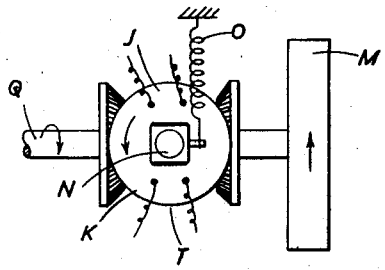
Figure 5 is a side elevation of another alternative construction of the torque switch of Figure 1.
Figure 6:
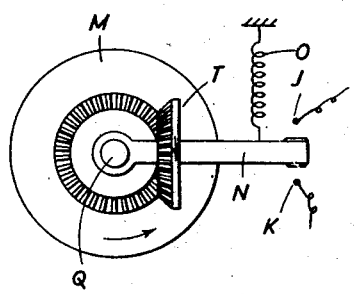
Figure 6 is an end elevation of the alternative construction shown in Figure 5, with the front pinion removed for clarity.

Figures 5 and 6 show another alternative construction for the torque switch, in which the flywheel M is driven from the driving shaft Q through a bevel type of differential gear T, the arm N being pivoted about the driving shaft and carrying the intermediate bevel gearwheel T. As before, the outer end of the arm N serves to bridge the contacts J or K, and springs O maintain a floating intermediate position of the arm at constant angular velocity.

The operation of the invention, which will now be described, is the same which ever of the constructions of torque switch described above is employed. If the "raise speed" button contacts H are closed, the relay F will be energised and will close the contacts $F^1$, thus setting the pilot motor E in motion to shift the speed-adjusting rheostat D. Thereupon the main motor A will begin to accelerate, and the corresponding acceleration of the driven machine will operate the torque switch L to close the contacts K. The operating coil of the relay G will not, however, be energised since the normally closed contacts $F^2$ have been opened by the relay F. The speed adjusting means D will continue to be shifted as long as the operator holds the "raise speed" button H pressed.

As soon as it is released, the relay F will be released, thereby opening the contacts $F^1$ to cut off the supply from the pilot motor E, and closing the contacts $F^2$. The movement of the speed adjusting means D has raised the equilibrium speed of the main motor A above its actual speed, and therefore acceleration is still taking place, and accordingly the contacts K are still closed by the torque switch L. Hence the closing of the contacts $F^2$ will have energised the relay G, which will close the contacts $G^1$ and start the pilot motor E moving in the opposite direction so as to lower the equilibrium speed of the main motor A. When the point is reached at which the rising actual speed is substantially equal to the falling equilibrium speed, there will be no further accelerating torque, and the contacts K will be opened by the torque switch L, thus releasing the relay G and stopping the pilot motor.

It will be clear that a similar sequence of events will take place, but in reverse, if the "lower speed" button I is depressed.

It will be appreciated that the invention is not limited to the particular arrangement described by way of example. Thus, the form of the speed-adjusting means may vary in accordance with the type of driving means, while the latter may include any form of variable-speed electric motor, or even other forms of driving means, such as steam or internal combustion engines.

What I claim as my invention and desire to secure by Letters Patent is:

1. In apparatus for controlling the speed of a main machine, the combination with speed adjusting means connected with said main machine and operable in either of two directions to raise and to lower respectively the speed of the main machine, pilot-motor means drivingly connected to said speed adjusting means, raise-speed and lower-speed relays connected to said pilot-motor means to energize the latter to drive said speed adjusting means in either of said directions, manually controlled raise-speed and lower-speed contacts in the circuits respectively of the raise-speed and lower-speed relay windings; normally open acceleration and deceleration contacts arranged to be closed in response respectively to acceleration and deceleration of the main machine, and connected in parallel respectively with the lower-speed and raise-speed manually controlled contacts; and normally closed contacts operated respectively by the raise-speed and lower-speed relays and connected in series respectively with the lower-speed and raise-speed relay windings.

2. In apparatus for controlling the speed of a main machine, the combination with speed adjusting means connected with said main machine and operable in either of two directions to raise and to lower respectively the speed of the main machine, pilot-motor means drivingly connected to said speed adjusting means, raise-speed and lower-speed relays connected to said pilot-motor means to energize the latter to drive said speed adjusting means in either of said directions, manually controlled raise-speed and lower-speed contacts in the circuits respectively of the raise-speed and lower-speed relay windings; a flywheel driven by the main machine; normally open acceleration and deceleration contacts so controlled by the torque transmitted to the flywheel as to be closed in response respectively to acceleration and deceleration thereof, and connected in parallel respectively with the lower-speed and raise-speed manually controlled contacts; and normally closed contacts operated respectively by the raise-speed and lower-speed relays and in series respectively with the lower-speed and raise-speed relay windings.

3. In apparatus for controlling the speed of a main machine, the combination with speed adjusting means connected with said main machine and operable in either of two directions to raise and to lower respectively the speed of the main machine, pilot-motor means drivingly connected to said speed adjusting means, manually operable raise-speed and lower-speed controls connected to said pilot-motor means to energize the latter to drive said speed adjusting means in either of said directions, acceleration responsive means driven by said main machine and connected to said pilot-motor means to energize the latter in a direction to lower the speed of said main machine in response to acceleration and to raise the speed in response to deceleration thereof, and devices interconnecting said raise-speed and lower-speed controls with said acceleration responsive means to render the latter inoperative during the period of operation of said controls.

4. Speed-controlling apparatus including a main machine, a flywheel driven thereby, acceleration-responsive means responsive to the torque transmitted to the flywheel and hence to acceleration and deceleration of the main machine, raise-speed and lower-speed controls operable at will, speed-adjusting means arranged to adjust the speed of the main machine, and pilot-motor means arranged to drive the speed-adjusting means in either direction and arranged to be set in motion both by the raise-speed and lower-speed controls and by the acceleration-responsive means when the raise-speed and lower-speed controls are not operated, so as to be set in motion to raise the speed when the raise-speed control is operated, and then, when that control is released, set in motion in the opposite direction so long as acceleration continues, and vice versa.

5. Speed-controlling apparatus as claimed in claim 4 in which the flywheel is mounted coaxially with a shaft driven by the main machine and in which electrical acceleration and deceleration contacts controlled by relative movement between the flywheel and shaft are arranged to set in motion the pilot motor means.

6. Speed-controlling apparatus as claimed in claim 5 in which the acceleration and deceleration contacts are arranged to rotate with the flywheel and shaft, and the current through them is supplied and collected by slip rings.

7. Speed-controlling apparatus including a main machine, gearing, a flywheel driven by the main machine through the gearing, acceleration-responsive means responsive to the reaction torque of the gearing and hence to acceleration and deceleration of the main machine, raise-speed and lower-speed controls operable at will, speed-adjusting means arranged to adjust the speed of the main machine, and pilot-motor means arranged to drive the speed-adjusting means in either direction and arranged to be set in motion both by the raise-speed and lower-speed controls and by the acceleration-responsive means when the raise-speed and lower-speed controls are not operated, so as to be set in motion to raise the speed when the raise-speed control is operated, and then, when that control is released, set in motion in the opposite direction so long as acceleration continues, and vice versa.

8. Speed-controlling apparatus including a main machine, a flywheel, differential gearing having two elements connected respectively to the main machine and to the flywheel so that the latter is driven by the former, while the third element controls electrical acceleration and deceleration contacts, raise-speed and lower-speed controls operable at will, speed-adjusting means arranged to adjust the speed of the main machine, and pilot-motor means arranged to drive the speed-adjusting means in either direction and arranged to be set in motion both by the raise-speed and lower-speed controls and by the acceleration and deceleration contacts when the raise-speed and lower-speed controls are not operated, so as to be set in motion to raise the speed when the raise-speed control is operated, and then, when that control is released, set in motion in the opposite direction so long as acceleration continues, and vice versa.

9. Speed-controlling apparatus as claimed in claim 8 in which the third element of the differential gearing is spring loaded so as to maintain a floating position in which neither the acceleration contacts nor the deceleration contacts are operated except when the angular velocity of the main machine is changing.

10. Speed-controlling apparatus as claimed in claim 9 in which the spring loaded is biased so as to allow for friction in the flywheel and associated parts.

11. Speed-controlling apparatus as claimed in claim 8 in which the differential gearing is of bevel type.

12. Speed-controlling apparatus as claimed in claim 8 in which the differential gearing is of epicyclic type.

ALEXANDER THORNTON ROBERTSON.

REFERENCES CITED

The following references are of record in the file of this patent:

UNITED STATES PATENTS

| Number | Name | Date |
|---|---|---|
| 1,982,338 | Cook | Nov. 27, 1934 |
| 2,403,605 | Lesnick | July 9, 1946 |